(12) United States Patent
Salter et al.

(10) Patent No.: US 9,129,430 B2
(45) Date of Patent: Sep. 8, 2015

(54) INDICATING OUT-OF-VIEW AUGMENTED REALITY IMAGES

(71) Applicants: Thomas George Salter, Seattle, WA (US); Ben Sugden, Woodinville, WA (US); Daniel Deptford, Redmond, WA (US); Robert Crocco, Jr., Seattle, WA (US); Brian Keane, Bellevue, WA (US); Laura Massey, Redmond, WA (US); Alex Kipman, Redmond, WA (US); Peter Tobias Kinnebrew, Seattle, WA (US); Nicholas Kamuda, Seattle, WA (US); Zachary Quarles, Seattle, WA (US); Michael Scavezze, Bellevue, WA (US); Ryan Hastings, Seattle, WA (US); Cameron Brown, Redmond, WA (US); Tony Ambrus, Seattle, WA (US); Jason Scott, Kirkland, WA (US); John Bevis, Seattle, WA (US); Jamie B. Kirschenbaum, Redmond, WA (US); Nicholas Gervase Fajt, Seattle, WA (US); Michael Klucher, Santa Clara, CA (US); Relja Markovic, Seattle, WA (US); Stephen Latta, Seattle, WA (US); Daniel McCulloch, Kirkland, WA (US)

(72) Inventors: Thomas George Salter, Seattle, WA (US); Ben Sugden, Woodinville, WA (US); Daniel Deptford, Redmond, WA (US); Robert Crocco, Jr., Seattle, WA (US); Brian Keane, Bellevue, WA (US); Laura Massey, Redmond, WA (US); Alex Kipman, Redmond, WA (US); Peter Tobias Kinnebrew, Seattle, WA (US); Nicholas Kamuda, Seattle, WA (US); Zachary Quarles, Seattle, WA (US); Michael Scavezze, Bellevue, WA (US); Ryan Hastings, Seattle, WA (US); Cameron Brown, Redmond, WA (US); Tony Ambrus, Seattle, WA (US); Jason Scott, Kirkland, WA (US); John Bevis, Seattle, WA (US); Jamie B. Kirschenbaum, Redmond, WA (US); Nicholas Gervase Fajt, Seattle, WA (US); Michael Klucher, Santa Clara, CA (US); Relja Markovic, Seattle, WA (US); Stephen Latta, Seattle, WA (US); Daniel McCulloch, Kirkland, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 90 days.

(21) Appl. No.: 13/927,056

(22) Filed: Jun. 25, 2013

(65) Prior Publication Data

US 2014/0375683 A1    Dec. 25, 2014

(51) Int. Cl.
| | |
|---|---|
| G09G 5/00 | (2006.01) |
| G06T 19/00 | (2011.01) |
| G06T 13/20 | (2011.01) |
| G06F 3/01 | (2006.01) |
| G06F 3/0481 | (2013.01) |

(52) U.S. Cl.
CPC .............. *G06T 19/006* (2013.01); *G06F 3/011* (2013.01); *G06F 3/013* (2013.01); *G06F 3/04815* (2013.01); *G06T 13/20* (2013.01)

(58) Field of Classification Search
CPC ......... G06F 3/011; G06F 3/012; G06F 3/013; G06F 3/017
USPC .......................... 345/7–9, 156–158, 173–178
See application file for complete search history.

(56) References Cited

U.S. PATENT DOCUMENTS

| | | | |
|---|---|---|---|
| 6,023,275 A | 2/2000 | Horvitz et al. | |
| 7,639,208 B1 * | 12/2009 | Ha et al. | 345/8 |
| 7,812,815 B2 * | 10/2010 | Banerjee et al. | 345/156 |
| 8,217,856 B1 | 7/2012 | Petrou | |
| 2008/0218331 A1 | 9/2008 | Baillot | |

| | | | |
|---|---|---|---|
| 2010/0103103 | A1* | 4/2010 | Palanker et al. ............... 345/158 |
| 2010/0149073 | A1* | 6/2010 | Chaum et al. ...................... 345/8 |
| 2010/0238161 | A1 | 9/2010 | Varga et al. |
| 2010/0253700 | A1 | 10/2010 | Bergeron |
| 2010/0328344 | A1* | 12/2010 | Mattila et al. ................. 345/633 |
| 2012/0050140 | A1 | 3/2012 | Border et al. |
| 2012/0075343 | A1 | 3/2012 | Chen et al. |
| 2012/0182206 | A1 | 7/2012 | Cok et al. |

FOREIGN PATENT DOCUMENTS

| | | |
|---|---|---|
| JP | 2000149167 A | 5/2000 |

OTHER PUBLICATIONS

Melzer, et al., "The Potential of an Interactive Hmd", retrieved at <<http://www.usaarl.army.mil/publications/HMD_Book09/files/Section%2028%20-%20Chapter19%20The%20Potential%20of%20Interactive%20HMD.pdf>> In Helmet-Mounted Displays: Sensation, Perception, and Cognition Issues, Retrieved Date: Feb. 9, 2013, pp. 22.

Gustafson, S. et al., "Comparing Visualizations for Tracking Off-Screen Moving Targets," Extended Abstracts on Human Factors in Computing Systems, pp. 2399-2404, Apr. 28, 2007, 6 pages.

Gustafson, S. et al., "Wedge: Clutter-Free Visualization of Off-Screen Locations," SIGCHI Conference on Human Factors in Computing Systems, pp. 787-796, Apr. 5, 2008, 10 pages.

Schinke, T. et al., "Visualization of Off-Screen Objects in Mobile Augmented Reality," 12th International Conference on Human Computer Interaction with Mobile Devices and Services, pp. 313-316, Sep. 7, 2010, 4 pages.

ISA European Patent Office, International Search Report and Written Opinion Issued in Application No. PCT/US2014/043304, Sep. 19, 2014, WIPO, 11 Pages.

* cited by examiner

Primary Examiner — Vijay Shankar
(74) Attorney, Agent, or Firm — Judy Yee; Micky Minhas

(57) ABSTRACT

Embodiments are disclosed that relate to operating a user interface on an augmented reality computing device comprising a see-through display system. For example, one disclosed embodiment includes identifying one or more objects located outside a field of view of a user, and for each object of the one or more objects, providing to the user an indication of positional information associated with the object.

19 Claims, 7 Drawing Sheets

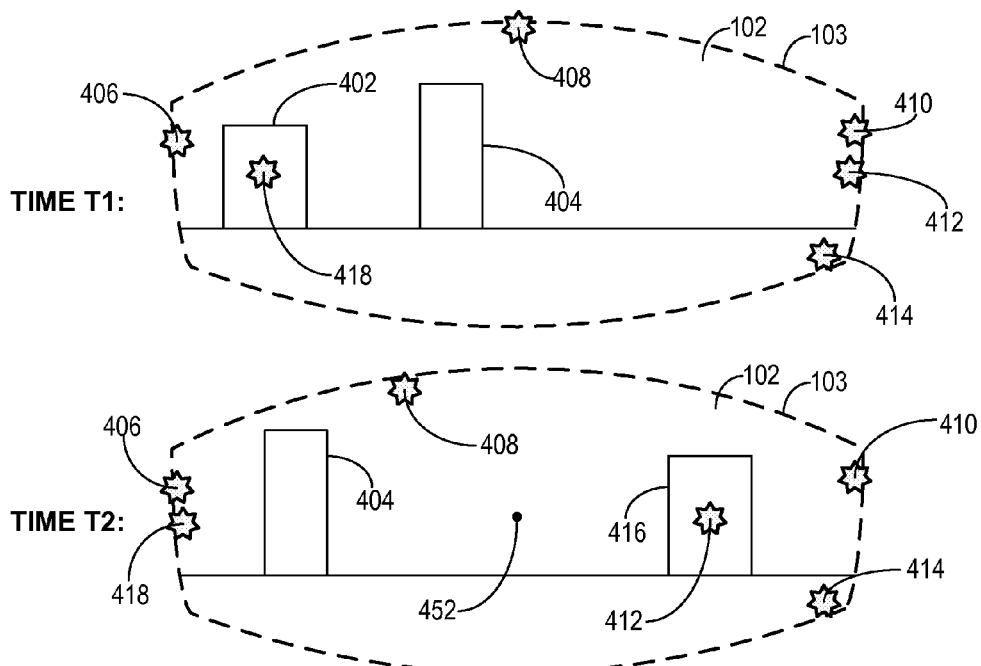
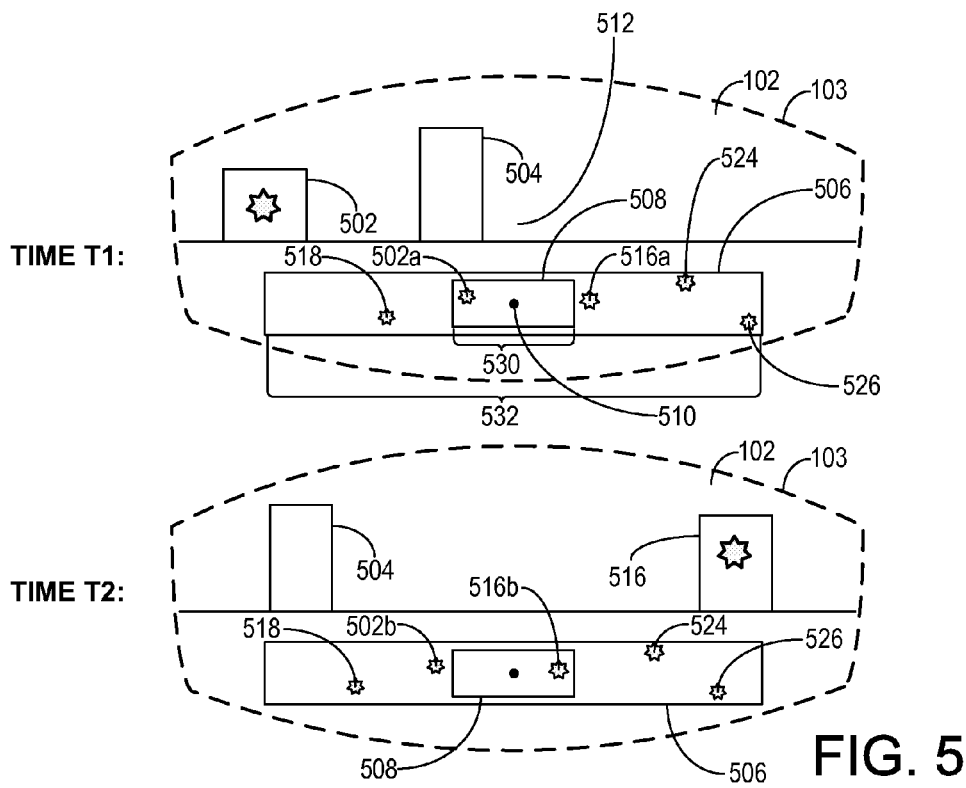

INDICATING OUT-OF-VIEW AUGMENTED REALITY IMAGES

BACKGROUND

Augmented reality computing devices, such as head-mounted display systems and handheld mobile devices (e.g. smart phones, tablet computers, etc.), may be configured to display information to a user about virtual or real objects in the field of view of the user and/or a field of view of a camera of the device. For example, a head-mounted display may be configured to display via a see-through display system virtual information regarding a real-world object in spatial registration with the real-world object. Similarly, a mobile device may display such information via a camera viewfinder window.

SUMMARY

Embodiments are disclosed that relate to operating a user interface on an augmented reality computing device. For example, one disclosed embodiment includes identifying one or more objects located outside a field of view of a user, and for each object of the one or more objects, providing to the user an indication of positional information associated with the object.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 4-8 show example indications of objects outside a field of view of a user on an augmented reality display device.

DETAILED DESCRIPTION

As mentioned above, an augmented reality display device may be configured to display virtual information (e.g. computer rendered text and/or imagery) associated with real and/or virtual objects in a use environment. However, as an augmented reality display device may have a limited field of view in which augmented reality imagery may be displayed, the user may not be aware of objects comprising associated augmented reality information that are located outside of this field of view, such as behind the user. As such, the user may miss out on the opportunity to view and/or interact with the augmented reality information for those objects.

Accordingly, embodiments are disclosed herein that relate to providing via an augmented reality display device indications of augmented reality data positioned in the environment at locations outside the field of view available for the presentation of such data. These indications may comprise any suitable type of indication, including but not limited to audio indications and/or visual indications.

Figure 1A:
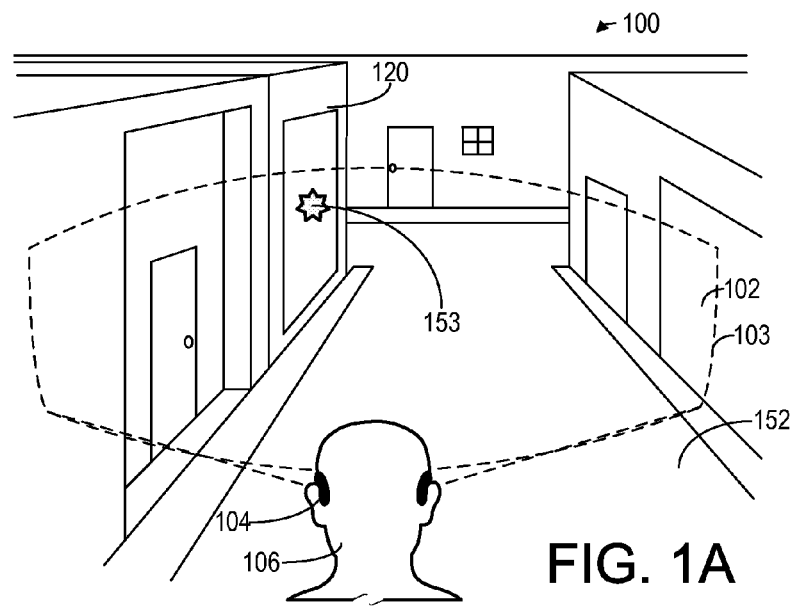
FIGS. 1A and 1B show schematic depictions of an example use environment for an augmented reality computing system.
Figure 1B:
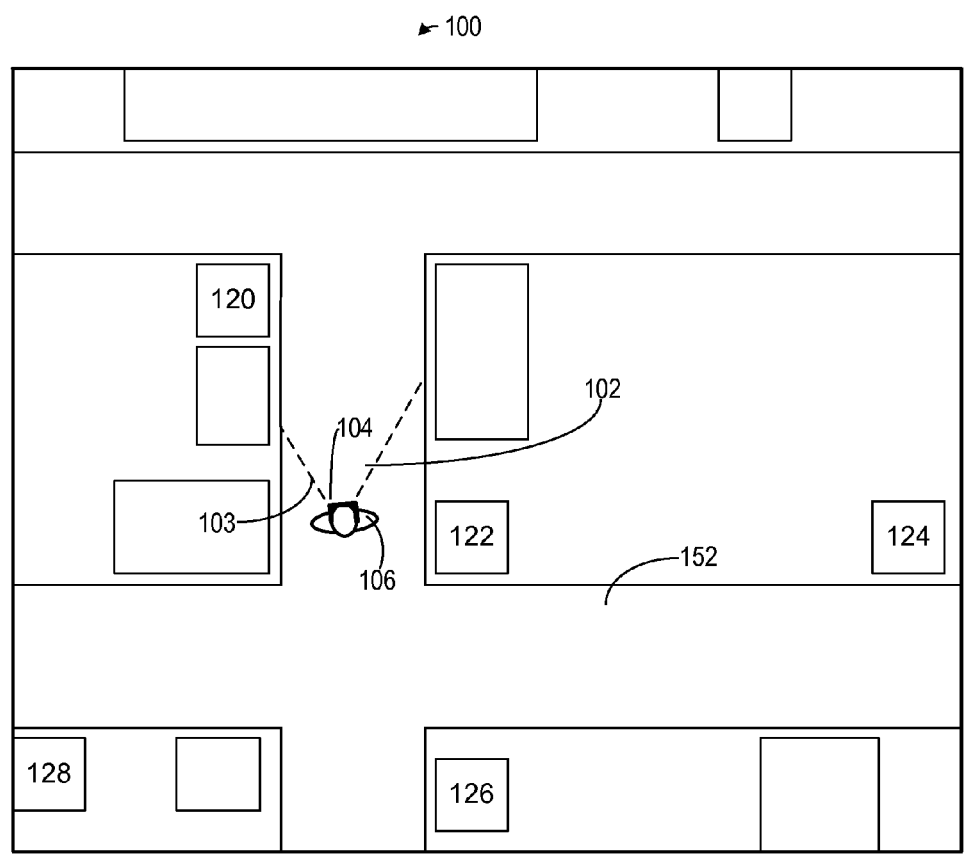

FIGS. 1A and 1B show an example embodiment of a use environment 100 for an embodiment of an augmented reality display device 104. The depicted augmented reality display device 104 takes the form of a head-mounted display device worn by a user 106, and comprises a field of view 102 in which augmented reality imagery is displayable. The use environment 100 takes the form of a street environment comprising a plurality of intersecting streets and various buildings, including buildings 120, 122, 124, 126, and 128. It should be understood that environment 100 is presented for the purpose of example, and that a use environment may take any other suitable form.

FIG. 1A shows a perspective of the environment 100 as viewed by user 106, and FIG. 1B shows a top view of environment 100. As mentioned above, the field of view 102 shown in FIGS. 1A and 1B comprises a portion of the environment viewable through the display device 104 that may be augmented with virtual imagery. In some embodiments, the field of view 102 may be substantially coextensive with the user's actual field of vision, while in other embodiments the field of view 102 may occupy a lesser portion of the user's actual field of vision. The field of view 102 comprises a periphery 103 outside of which augmented reality imagery is not displayable by the augmented reality display device 104.

The augmented reality environment 100 may include a variety of real-world objects and a variety of virtual objects or visual features displayable with the real-world surfaces and objects. For example, buildings 120, 122, 124, 128, and 126 may include restaurants. As such, if user 106 requests information about nearby restaurants in environment 100, the augmented reality display device may display virtual object indications of the nearby restaurants in spatial registration with the corresponding buildings. As a non-limiting example of such an indication, an icon 153 (e.g., a pin or other marking) may be overlaid on building 120 indicating that building 120 includes a restaurant. Additionally, any other suitable information, such as a business name, logo, telephone number, menu, review(s), etc. may be displayed or accessible via the indication.

However, although buildings 122, 124, 126, and 128 also contain restaurants, user 106 may be unaware of these options due to the restaurants being located outside of the field of view 102. For example, building 122, which includes a restaurant very close to user 106, is just outside of the field of view 102. As such, the user 106 may not be made aware of this restaurant unless the user moves to place building 122 in the field of view 102.

Thus, various indications, e.g., audio or visual features, may be presented to user 106 to alert the user to information in the environment which is outside of the augmented reality field of view. The indications may be provided by a user interface that is persistent or non-persistent (e.g. displayed upon user request), and may provide information about available augmented reality information in an extended surrounding space. This interface may be visual, e.g., represented by on-screen markers or maps, audible, e.g., where a set of sounds indicates to the user presence and proximity of data, and/or may take any other suitable form (e.g. tactile/haptic). In this way, a user may be alerted to digital information embedded in a user's physical environment even when the information is out of sight of the user.

Figure 2:
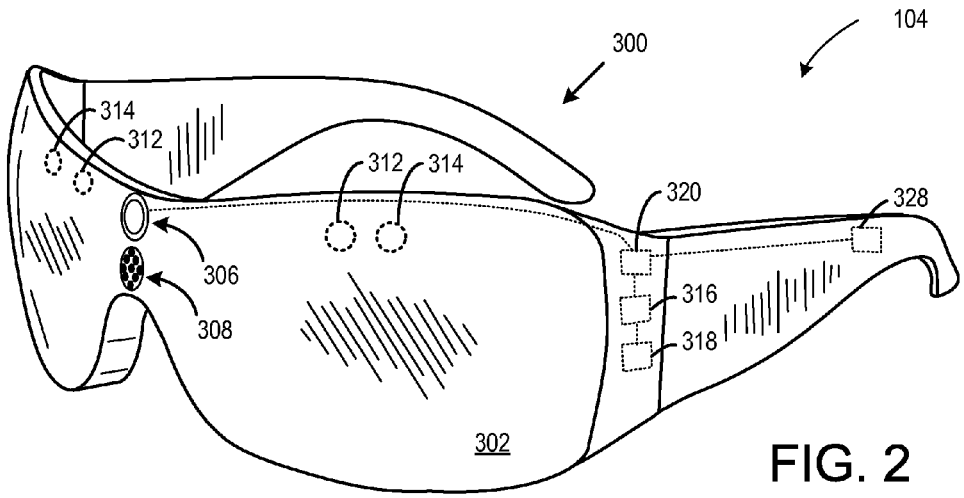
FIG. 2 schematically shows an example embodiment of an augmented reality display device.
Figure 3:
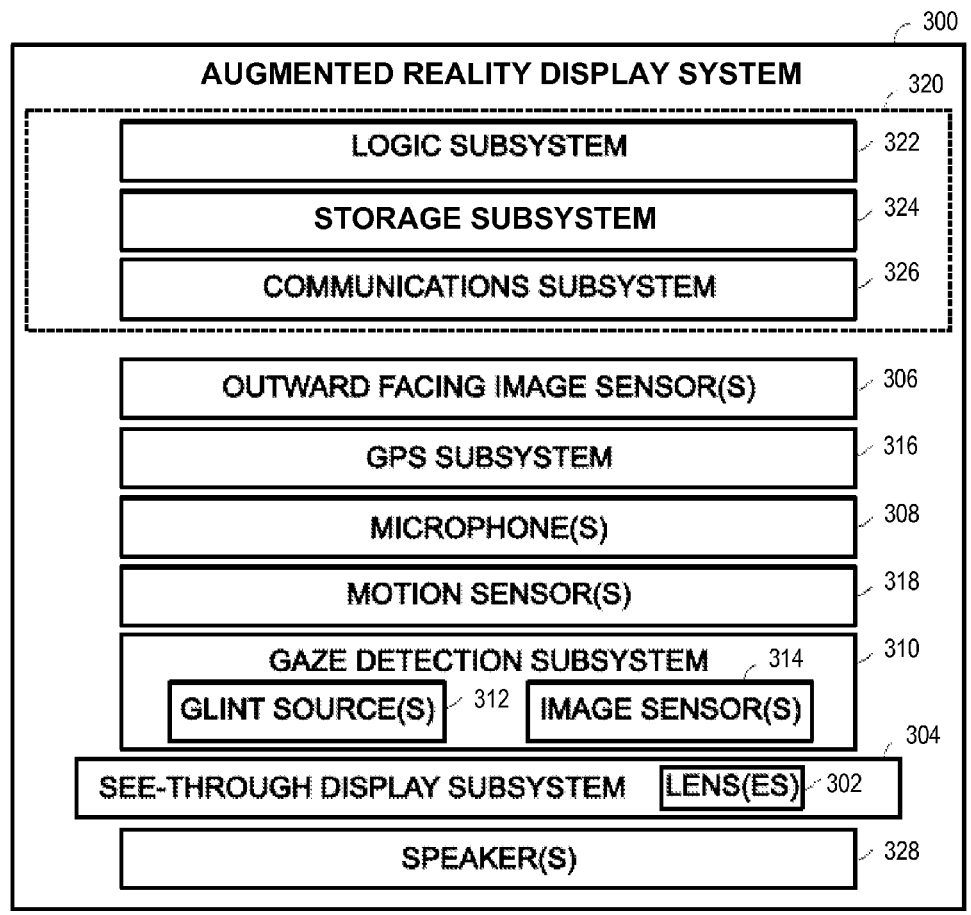
FIG. 3 is a block diagram of the display device of FIG. 2.

An augmented reality display device according to the present disclosure may take any suitable form, including but not limited to near-eye devices such as the head-mounted display device 104 of FIGS. 1A and 1B and other mobile devices. FIG. 2 shows an example embodiment of an augmented reality display system 300, and FIG. 3 shows a block diagram of the display system 300.

Display system 300 comprises one or more lenses 302 that form a part of a see-through display subsystem 304, such that images may be displayed via lenses 302 (e.g. via projection onto lenses 302, waveguide system(s) incorporated into lenses 302, and/or in any other suitable manner). Display system 300 further comprises one or more outward-facing image sensors 306 configured to acquire images of a background scene and/or physical space being viewed by a user, and may include one or more microphones 308 configured to detect sounds, such as voice commands from a user. Outward-facing image sensors 306 may include one or more depth sensors and/or one or more two-dimensional image sensors. In other embodiments, an augmented reality display system, instead of a see-through display subsystem, may display augmented reality images via a viewfinder mode for an outward-facing image sensor.

Display system 300 may further comprise a gaze detection subsystem 310 configured to detect a direction of gaze of each eye of a user or a direction or location of focus, as described above. Gaze detection subsystem 310 may be configured to determine gaze directions of each of a user's eyes in any suitable manner. For example, in the depicted embodiment, gaze detection subsystem 310 comprises one or more glint sources 312, such as infrared light sources, configured to cause a glint of light to reflect from each eyeball of a user, and one or more image sensors 314, such as inward-facing sensors, configured to capture an image of each eyeball of the user. Changes in the glints from the user's eyeballs and/or a location of a user's pupil as determined from image data gathered via the image sensor(s) 314 may be used to determine a direction of gaze. Further, a location at which gaze lines projected from the user's eyes intersect the external display may be used to determine an object at which the user is gazing (e.g. a displayed virtual object and/or real background object). Gaze detection subsystem 310 may have any suitable number and arrangement of light sources and image sensors. In other embodiments, gaze detection subsystem 310 may be omitted.

Display system 300 may further comprise additional sensors. For example, display system 300 may comprise a global positioning (GPS) subsystem 316 to allow a location of the display system 300 to be determined. This may help to identify objects, such as buildings, etc., that are located in the user's surrounding physical environment.

Display system 300 may further include one or more motion sensors 318 to detect movements of a user's head when the user is wearing display system 300. Motion data may be used, potentially along with eye-tracking glint data and outward-facing image data, for gaze detection, as well as for image stabilization to help correct for blur in images from the outward-facing image sensor(s) 306. The use of motion data may allow changes in gaze location to be tracked even if image data from outward-facing image sensor(s) 306 cannot be resolved. Likewise, motion sensors 318, as well as microphone(s) 308 and gaze detection subsystem 310, also may be employed as user input devices, such that a user may interact with the display system 300 via gestures of the eye, neck and/or head, as well as via verbal commands. It will be understood that sensors illustrated in FIGS. 2 and 3 are shown for the purpose of example and are not intended to be limiting in any manner, as any other suitable sensors and/or combination of sensors may be utilized.

Display system 300 further comprises a controller 320 having a logic subsystem 322 and a storage subsystem 324 in communication with the sensors, gaze detection subsystem 310, display subsystem 304, and/or other components. Storage subsystem 324 comprises instructions stored thereon that are executable by logic subsystem 322, for example, to receive and interpret inputs from the sensors, to identify location and movements of a user, to identify real objects in an augmented reality field of view and present augmented reality imagery therefore, to detect objects located outside a field of view of the user, and to present indications of positional information associated with objects located outside the field of view of the user, among other tasks.

It will be appreciated that the depicted display devices 104 and 300 are described for the purpose of example, and thus are not meant to be limiting. It is to be further understood that the display device may include additional and/or alternative sensors, cameras, microphones, input devices, output devices, etc. than those shown without departing from the scope of this disclosure. Additionally, the physical configuration of a display device and its various sensors and subcomponents may take a variety of different forms without departing from the scope of this disclosure.

FIGS. 4-8 show example embodiments of indications of objects outside a field of view 102 available for the display of augmented reality imagery on an augmented reality display device, wherein the indicated objects correspond to object having associated augmented reality information. The term "outside of a field of view" and the like as used herein signify objects out of an angular field of view, objects occluded by other objects (real or virtual), and/or objects that are not directly visible for any other reason. First, FIG. 4 shows an example field of view 102 at a first time T1 and at a second, later time T2. At time T1, an object 402 and an object 404 are within the field of view 102. Objects 402 and 404 may comprise real or virtual objects, wherein a virtual object may be any object displayed or displayable in an augmented reality image that is not present in the physical scene and that is combined with an image of the physical scene to form the augmented reality image. In this example, a plurality of objects are located outside field of view 102. As such, a corresponding plurality of visual indications in the form of markers 406, 408, 410, 412, and 414 are displayed within field of view 102, thereby indicating the presence of the objects located outside the field of view 102.

In the depicted embodiment, the markers are displayed adjacent to a periphery 103 of the field of view 102, but may have any other suitable appearance. Further, the markers may be displayed in a location that represents a relative location of the corresponding out-of-view object. For example, markers 410, 412, and 414 positioned at the right side of the field of view 102 may indicate objects positioned to the right of the user outside the user's field of view, and thus may indicate a direction to turn to view the corresponding objects. As another example, marker 408 positioned at a top border of the field of view 102 may indicate that the user can turn or look upwards to view the corresponding object. As still another example, marker 406 is displayed on the right edge of field of view 102, thereby directing the user to look or turn to the right to view the corresponding object.

At time T2, the user has shifted their field of view toward the right so that object 416 associated with marker 412 comes into the user's field of view 102. In some examples, marker 412 may continue to be displayed after object 416 comes into the field of view in order to direct the user's attention to object 416. However, in other examples, marker 412 may no longer be displayed or may change in appearance, e.g., change color shape, size, content of information displayed, orientation, etc., when the corresponding object enters field of view 102. Further, this shift of the field of view toward the right shown at time T2 causes object 402 to move outside field of view 102. Thus, a marker 418 associated with object 402 is displayed at the left edge of the field of view to indicate that object 402 is now located outside the field of view towards the left.

In the depicted example, markers for objects both within and outside of field of view 102 are depicted with a same appearance for clarity. However, it will be understood that different information, or no information, may be displayed for objects inside of the field of view. For example, in the example of a search for nearby restaurants, the markers at the periphery of the field of view 102 may indicate the presence of out-of-view restaurants, but no name information, while markers for restaurants in the field of view may comprise additional information, such as a restaurant name, phone number, links to menus, reviews, etc. Likewise, in the context of a user search for a specific business, a peripheral marker that indicates the out-of-view location of the business may disappear and not be replaced by a different marker, as the business name may be clearly evident in the real-world environment.

It will be understood that the visual indicators shown in FIG. 4 are presented for the purpose of example, and that a visual indicator may take any other suitable form. Further, the indicators may indicate information other than relative location. For example, an appearance of a visual indicator may vary based on properties of the object, such as a distance from the object to the user and/or a direction from the object to the user. Thus, an appearance of a marker may vary based on changes in the object relative to the user, such as changes in distance from user and/or direction relative to user, etc.

Further, the indicators may indicate other information than locational information. For example, an appearance of a visual indicator may signify density of objects comprising augmented reality information in a particular direction or location, in that a corresponding number of markers may be displayed on that side of the display. As another example, a size of a visual indicator may be based on a number of objects associated with that visual indicator, such that a relatively larger size of a displayed marker may indicate a relatively larger number of objects associated with that marker. It will be understood that as the user changes perspective or changes the field of view 102 in the environment, display of the markers may be dynamically updated to reflect changes in features, information, and objects located outside the field of view 102.

In some examples, a position at which a visual indicator is displayed may be determined based on a center point 452 of the field of view 102. For example, the center point 452 of the user's gaze both vertically and horizontally may be opposite from a dividing line that will determine if a marker appears on the right, the left, the top, or the bottom along the periphery 103 of field of view 102. In such examples, a visible asset located behind the user and slightly to the right may be indicated by a marker displayed on the right hand periphery of field of view 102. In other embodiments, visual indicators may be positioned in any other suitable manner.

FIG. 5 shows another example visual indicator in the form of a virtual map 506 of augmented reality assets. At time T1, object 502 and object 504 are within the field of view 102 of the user. The virtual map 506 represents a physical area in the environment greater than the field of view 102. For example, the field of view may be indicated as rectangular region with a width 532 containing a center region 508 less than the width 532 of the virtual map, wherein the center region 508 represents the field of view 102 of the user. In some examples, center region 508 may include a center indicator or dot 510 which represents the center 512 of field of view 102.

The center region 508 may assist the user in identifying elements or objects having associated augmented reality information which are displayed within field of view 102 and those that are displayed outside field of view 102. For example, as shown at time T1, marker 502a displayed within center region 508 may correspond to object 502. Markers for objects outside field of view 102 are displayed outside of center region 508 within virtual map 506. For example, visual indicators or markers 518, 516a, 524, and 526 are displayed on virtual map 506 to indicate the presence of objects located outside the field of view 102.

The virtual map 506 may be displayed in any suitable manner. For example, the virtual map 506 may be displayed as a persistent head locked map that shows a layout of elements around the user, wherein markers displayed on the map may change location with user movements. Further, in some embodiments, the appearance of markers displayed in the virtual map may be based on the type of objects which they represent. For example, a marker in virtual map 506 with a first color may indicate a first type of object (e.g. a restaurant) whereas a marker in virtual map 506 with a second color may represent a second type of object (e.g. a retail store).

The virtual map 506 may be displayed at any suitable location on a display and may have any suitable appearance. For example, in the depicted embodiment, the virtual map 506 is displayed at a bottom region of field of view 102. Further, the virtual map 506 may be at least partially translucent or transparent so that the virtual map 506 does not intrude on the user's view of elements in field of view 102. In the depicted embodiment, the virtual map may display representations of objects within a 360 degree area surrounding the user, but may indicate any other suitable angular range.

Continuing with FIG. 5, at time T2, the user's field of view has shifted toward the right so that an object 516 associated with marker 516a comes into the user's field of view 102. As shown at time T2, a marker 516b is now displayed in center region 508 indicating that object 516 is now located within field of view 102. In some examples, an appearance of a marker associated with an object displayed on virtual map 506 may change depending on whether or not the object is in the field of view 102. For example, marker 522 may be displayed in a first manner when object 516 is located outside the field of view 102, e.g., with a first color, size, and/or shape, and may be displayed in a second different manner when object 516 enters field of view 102. It will be noted that this shift of the field of view toward the right shown at time T2 causes object 502 to move outside field of view 102. Thus, marker 520b associated with object 502 is displayed on virtual map 506 outside of central region 508 toward the left of the central region to indicate that that object 502 is now located outside the field of view towards the left.

Figure 6:
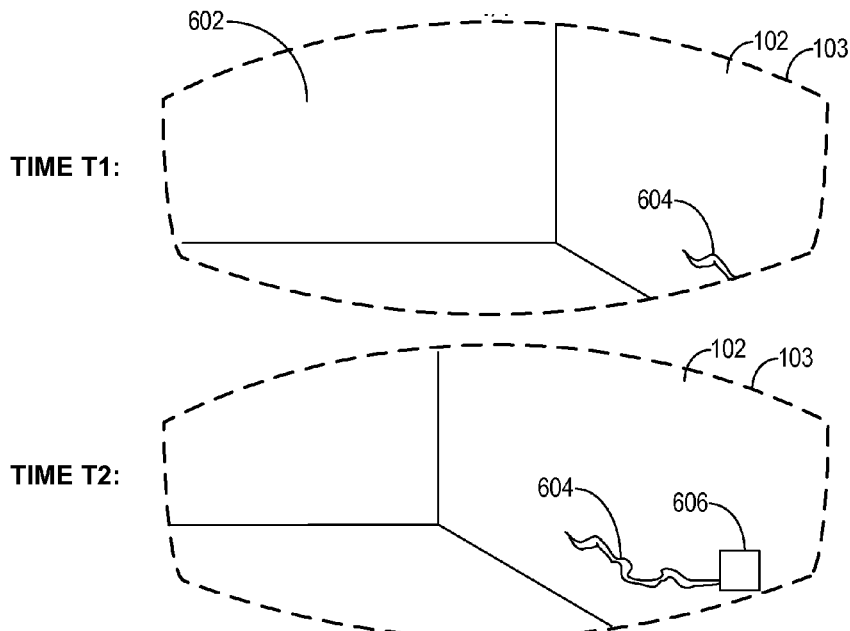
Figure 7:
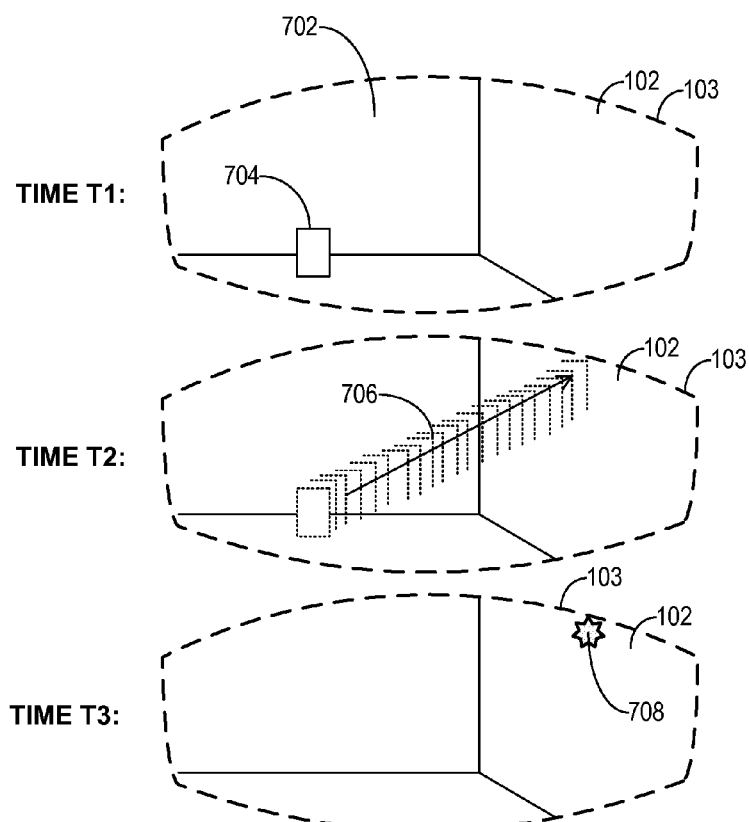

FIG. 6 shows another example embodiment of a visual indicator. In this example, a room environment 602 is shown in field of view 102. At time T1, a visual indicator 604 is displayed at a bottom right periphery of field of view 102 to indicate the presence of an object located outside field of view 102 in a direction outside the bottom right of field of view 102. The visual indicator 604 may comprise a route, a path, an arrow, or other indication of directionality which a user may follow in order to be directed to the object it represents. In the depicted embodiment, visual indicator 604 may be represented as a tendril (e.g. a vine-like feature or other representation of a line) extending from object 606, which may represent a notification block or other virtual object. Thus, a user may visually follow indicator 604 towards object 606 by turning towards the right to bring the object 606 into view.

A tendril may be used in any suitable context to lead a user's gaze to a object located outside of a current augmented reality field of view. The tendril acts as a line that leads from within the field of view toward the object outside the field of view. Thus, a user may visually follow the tendril to find the object to which the tendril leads. Such tendrils may be displayed persistently for out-of-view objects, or may be displayed upon occurrence of a suitable trigger. For example, a tendril for an out-of-view object may appear upon receipt of a user input (voice, gaze, gesture, etc.) to select or view the object. In other examples, a tendril may be displayed in response to a world recognition event (e.g. recognizing an object, event, or other real-world item of interest).

As another example, display of a tendril may be triggered when a corresponding out-of-view object has new activity to be viewed. For example, a tendril may be displayed to lead a viewer's gaze to an out-of-view email inbox when a new email message is received. Additionally, a tendril may be used to indicate an out-of-view object that currently has user focus. For example, if a user is currently entering text into a text entry box and then gazes in a different direction such that the text box is no longer visible, the display of a tendril that leads back to the text box may be triggered. A tendril also may lead a user to objects that are obscured by other objects. For example, a tendril may lead around a corner or a wall to an out-of-view object. In any of these examples, a tendril may persist or disappear when the out-of-view object comes into view.

A tendril may have any suitable appearance. For example, in some embodiments a tendril may have a vine-like appearance. In other embodiments, the tendril may have the appearance of any other suitable representation of a path leading to an out-of-view object. A tendril may originate from a location adjacent to a periphery of a display, or may originate closer to a center of a user's field of view. Further, as described above with regard to other embodiments, a color, shape, size, opacity, and/or other suitable property of a tendril may be varied based upon object properties such as object type, location, and/or virtual or real world placement.

In some embodiments, audio cues may be used to alert a user to the creation of a tendril. For example, using the email example above, an audio output, such as a hum, tone, or other suitable sound, may be output to indicate the creation of a tendril upon receipt of a new email message in an out-of-view email inbox. Further, a characteristic of the sound may be varied to provide additional information on the object. For example, a high pitched hum may be used to indicate that the object is far away, while a low pitched hum may indicate an object that is nearby. It will be understood that these embodiments are described for the purpose of example, and are not intended to be limiting in any manner.

In some examples, a visual indicator may represent an object that is moved from within the field of view available for the display of augmented reality imagery. For example, referring to FIG. 7, a user in an environment 702 may initially be interacting with an object 704, such as a photograph, user interface control, application interface/window, or any other suitable object, as shown at time T1.

When the user has finished interacting with the object 704, the object may be moved to a location outside of field of view 102 (automatically or by user action). Thus, as illustrated at time T2, an animation 706 may be displayed within field of view 102 indicating movement of object 704 toward the out-of-view location. The appearance of animation 706 may be based on various properties of the movement of object 704 and/or a location to which object 704 is sent. For example, a velocity of the animation 706 may indicate how far off screen the object 704 is going to land, wherein a relatively higher velocity may indicate a relatively greater distance outside the field of view. Animation 706 may take any other suitable form, including but not limited to pulses extending along a route or tendril that indicates the location to which object 704 is moving. Next referring to time T3, after the object 704 moves outside field of view 102, a marker 708 may be displayed at periphery 103 of field of view 102 indicating the location at which the object 704 is positioned outside the field of view 102.

Further, in some embodiments, an animation may be displayed within field of view 102 which indicates actions performed on an object located outside the field of view. For example, changes in an appearance of a tendril based upon user interaction with an object to which the tendril leads may be animated to indicate user activity with the object. As a more specific example, if a user is looking at an object, e.g., a text entry box, displayed in the field of view and provides input via a real-world input device, e.g., a keyboard, located outside the field of view, then an animation or other suitable indicator may be displayed as originating at the real-world input device and terminating at the text entry box within the field of view to indicate this user activity with the out-of-view object (the keyboard). Such an animation may have any suitable appearance. As one non-limiting example, as the user provides input to the real-world input device, e.g., as the user presses the keys on a keyboard located outside the field of view, an animated pulse traveling up a tendril from the input device to the text entry box may be displayed.

Figure 8:
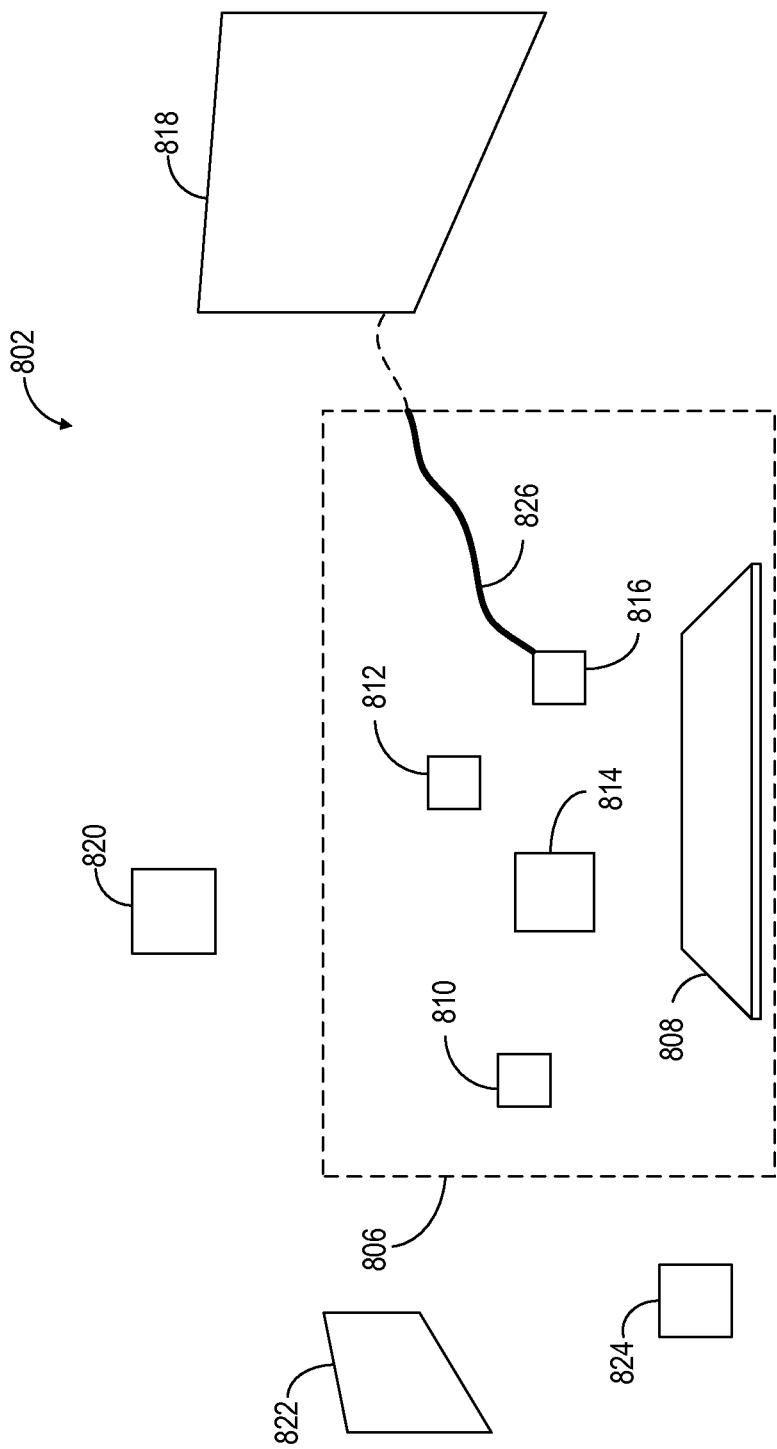

FIG. 8 shows another example use of tendrils to indicate positional information associated with out-of-view objects in an augmented reality environment 802. More specifically, FIG. 8 shows a plurality of virtual objects 818, 820, 822 and 824 located outside a field of view 806 of an augmented reality display device. Virtual objects 818, 820, 822 and 824 may be application user interfaces or any other suitable object with which a user of the display device may interact. FIG. 8 also shows a group of indicators 810, 812, 814, and 816, such as icons, associated with objects 818, 820, 822 and 824, wherein the indicators are currently displayed at a position that is currently within field of view 806. For example, indicator 810 may correspond to object 824, indicator 812 may correspond to object 822, indicator 814 may correspond to object 820, and indicator 816 may correspond to object 818. FIG. 8 also depicts a real object in the form of a keyboard 808.

Virtual objects 818, 820, 822, and 824 may be "world locked," in that they may not move relative to a real-world background as user's perspective changes in the environment 802. As such, a virtual object may at times be out of the field of view 806. Thus, a user may locate objects by viewing the group of indicators and selecting an indicator corresponding to the desired virtual object (e.g. by selecting an icon corresponding to a desired application). The selection may be made by voice, gaze, body gesture (e.g. head gesture as detected by motion sensors, arm gesture as detected by an image sensor, etc.), and/or any other suitable mechanism. This selection may result in the display of a tendril 826 in field of view 806 to lead the user's gaze to the associated object. In FIG. 8, the part of the tendril 826 that is currently in a user's field of view is shown in solid lines, and the part that is currently out of the field of view is shown in dashed lines. By visually following the tendril for its length, the user may locate the desired virtual object.

Figure 9:
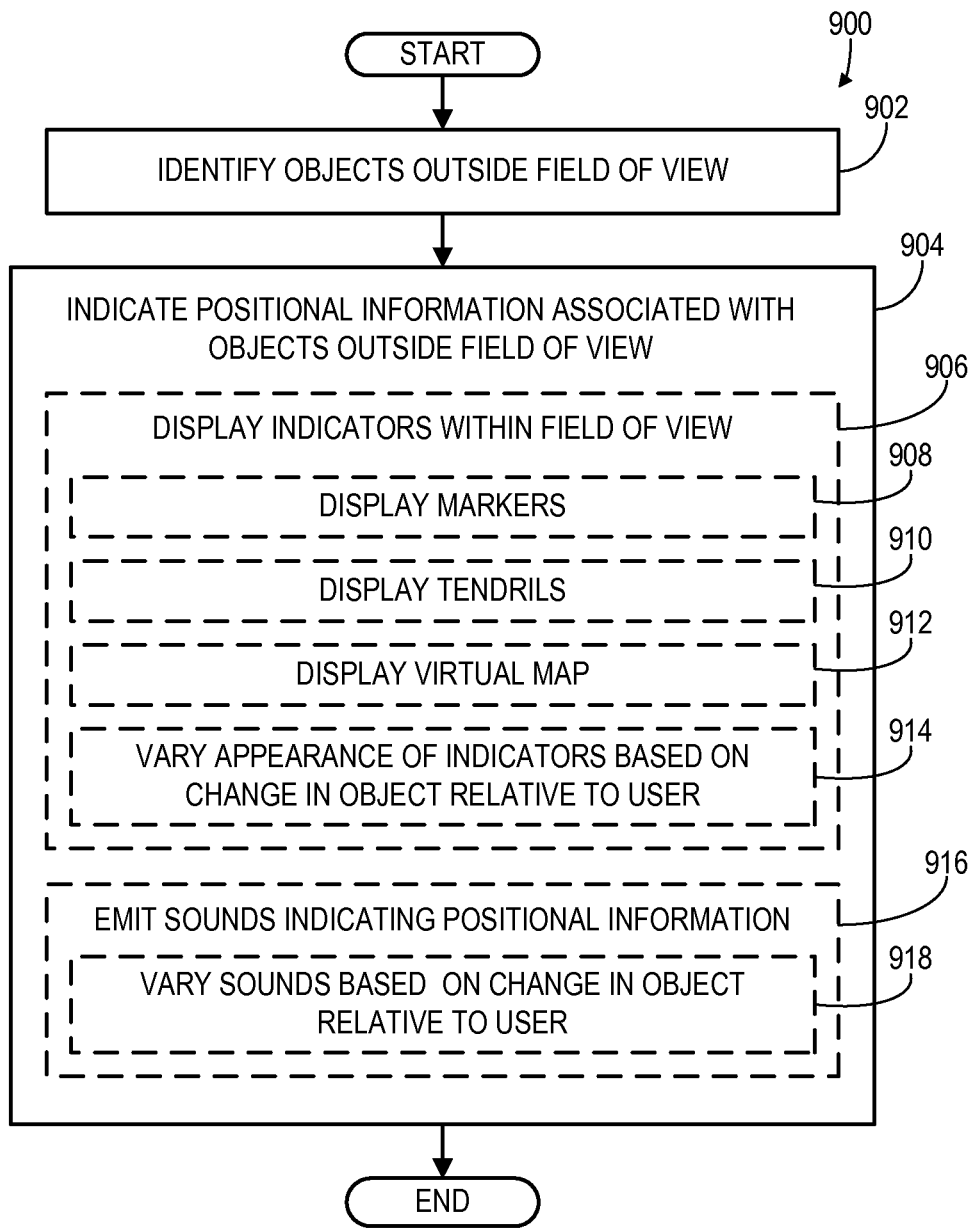
FIG. 9 shows an example method for operating a user interface on an augmented reality computing device in accordance with the disclosure.

FIG. 9 shows a flow diagram depicting an example of a method 900 for operating a user interface on an augmented reality computing device to provide indications of real and/or virtual objects located outside a field of view of a user. As described below, these indications may include visual indications and/or audio indications.

At 902, method 900 includes identifying objects outside a field of view of a user that include associated augmented reality information. Identifying objects outside the field of view includes obtaining information about the objects in any way, e.g., information generated or detected locally and/or information obtained from other devices. The objects may comprise any suitable real and/or virtual objects. Method 900 further comprises indicating positional information associated with the objects outside of the field of view of the user. The indication may comprise information regarding a position of the object relative to a position of the user to convey to the user a direction to look to view the objects, and/or any other suitable information regarding the objects.

The indication may be provided in response to any suitable trigger. In some examples, the indications may be provided to the user in response to a user input, e.g., a gesture (gaze gesture, body gesture, etc.), a speech input, or other suitable input. In other examples, indications may be automatically provided to the user based upon a programmatic trigger, which may depend on the user's environment.

As mentioned above and shown at 906, presenting the indicator may comprise displaying a visual indicator via a display device. The displayed visual indicator may have any suitable appearance. For example, as shown at 908, the visual indicators may take the form of markers. Further, an appearance of the markers may indicate information such as a direction to turn to view the object, a distance of the object from the field of view available for the display of augmented reality imagery, etc. The markers may be displayed at the periphery of the field of view, or at any other suitable location.

As another example, visual indicators also may take the form of paths, such as tendrils, that a user can visually follow to find the associated objects, as indicated at 910. For example, a marker may comprise a visually displayed path extending from a location within the field of view of the user towards or to the object. As still another example, visual indicators may be displayed via a virtual map, as indicated at 912. Such a map may take the form of an overlay that maps a physical area larger than the field of view usable to display augmented reality imagery, and may have any suitable appearance, non-limiting examples of which are described above.

As a user turns or moves in response to the display of visual indicators, the display of the visual indicators may change, as indicated at 914. For example, an appearance of a marker may be varied based on one or more of a property of the object, a distance from the object to the user, and an orientation of the object relative to the user. Varying a display of a marker may comprise one or more of varying a color of the object, varying an opacity of the object, varying a size of the object, varying a shape of the object, and varying a movement of the object. Where the appearance of a marker is varied based upon a property of the object, the property may comprise a global property or a context-specific (e.g. application specific) property. For example, in an augmented reality video game, a color of a marker may be used to indicate a relative value/importance of a game object (e.g. a highest value or most difficult enemy).

Further, the indication of the objects out of the user's view also may comprise audio indications, instead of or in addition to visual indicators. Thus, at 916, method 900 may include emitting one or more sounds from speakers indicating a presence of an object or objects. The audio indications may take any suitable form. For example, the indications may take the form of chimes/bells, beeps, other tones, as well as more complex outputs, such as computerized speech outputs.

As with the visual indicators, the presentation of an audio indication may change as the user's position changes relative to out-of-view objects, or based upon other state changes, as indicated at 918. The sounds may be varied based on any suitable factors, such as one or more of a property of the object, a distance from the object to the user, and/or an orientation of the object relative to the user. Further, the sounds may be varied in any suitable manner. For example, the sounds may be varied by varying a volume of the one or more sounds, varying one or more frequencies of the one or more sounds, varying a timbre of the sound, varying an apparent position of the one or more sounds (e.g. by applying a head-related transfer function (HRTF) based upon the relative locations of an object and a user), and varying a tactile/haptic response. As a more specific example, a user may request "are there any coffee shops nearby" via speech or text input. In response, the relative locations of coffee shops may be represented by sequentially presented output tones (one for each coffee shop), wherein the signals applied to each of two or more speakers (e.g. earphones on a head-mounted display device) for each tone are modified based upon an HRTF determined based upon the relative locations of the user and the associated coffee shop.

In other examples, the distance to the object and/or relative location of the object may also be indicated either by sound pattern, by tempo, by pitch, or by length of the sound. Such sound qualities may further be used to indicate the density of the available information, and/or any other suitable information. For example, a density of objects on each side of a display may be indicated by relative differences in pitch of sounds used to indicate the densities.

In some embodiments, the methods and processes described above may be tied to a computing system of one or more computing devices. In particular, such methods and processes may be implemented as a computer-application program or service, an application-programming interface (API), a library, and/or other computer-program product.

Figure 10:
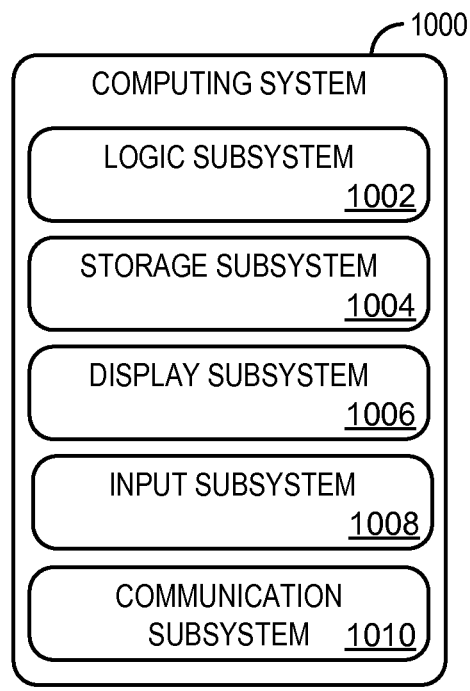
FIG. 10 schematically shows an example computing system.

FIG. 10 schematically shows a non-limiting embodiment of a computing system 1000 that can enact one or more of the methods and processes described above. Display device 104 may be one non-limiting example of computing system 1000. Computing system 1000 is shown in simplified form. It will be understood that virtually any computer architecture may be used without departing from the scope of this disclosure. In different embodiments, computing system 1000 may take the form of a display device, wearable computing device, mainframe computer, server computer, desktop computer, laptop computer, tablet computer, home-entertainment computer, network computing device, gaming device, mobile computing device, mobile communication device (e.g., smart phone), etc.

Computing system 1000 includes a logic subsystem 1002 and a storage subsystem 1004. Computing system 1000 may optionally include a display subsystem 1006, input subsystem 1008, communication subsystem 1010, and/or other components not shown in FIG. 10.

Logic subsystem 1002 includes one or more physical devices configured to execute instructions. For example, logic subsystem 1002 may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

Logic subsystem 1002 may include one or more processors configured to execute software instructions. Additionally or alternatively, logic subsystem 1002 may include one or more hardware or firmware logic machines configured to execute hardware or firmware instructions. The processors of logic subsystem 1002 may be single-core or multi-core, and the programs executed thereon may be configured for sequential, parallel or distributed processing. Logic subsystem 1002 may optionally include individual components that are distributed among two or more devices, which can be remotely located and/or configured for coordinated processing. Aspects of logic subsystem 1002 may be virtualized and executed by remotely accessible, networked computing devices configured in a cloud-computing configuration.

Storage subsystem 1004 includes one or more physical devices configured to hold data and/or instructions executable by logic subsystem 1002 to implement the methods and processes described herein. When such methods and processes are implemented, the state of storage subsystem 1004 may be transformed—e.g., to hold different data.

Storage subsystem 1004 may include removable media and/or built-in devices. Storage subsystem 1004 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard-disk drive, floppy-disk drive, tape drive, MRAM, etc.), among others. Storage subsystem 904 may include volatile, nonvolatile, dynamic, static, read/write, read-only, random-access, sequential-access, location-addressable, file-addressable, and/or content-addressable devices.

It will be appreciated that storage subsystem 1004 includes one or more physical device, and excludes propagating signals per se. However, in some embodiments, aspects of the instructions described herein may be propagated by a pure signal (e.g., an electromagnetic signal, an optical signal, etc.) via a communications medium, as opposed to being stored on a storage device. Furthermore, data and/or other forms of information pertaining to the present disclosure may be propagated by a pure signal.

In some embodiments, aspects of logic subsystem 1002 and of storage subsystem 1004 may be integrated together into one or more hardware-logic components through which the functionally described herein may be enacted. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

When included, display subsystem 1006 may be used to present a visual representation of data held by storage subsystem 1004. This visual representation may take the form of a graphical user interface (GUI). As the herein described methods and processes change the data held by the storage subsystem, and thus transform the state of the storage subsystem, the state of display subsystem 1006 may likewise be transformed to visually represent changes in the underlying data. Display subsystem 1006 may include one or more display devices utilizing virtually any type of technology. Such display devices may be combined with logic subsystem 1002 and/or storage subsystem 1004 in a shared enclosure, or such display devices may be peripheral display devices.

When included, input subsystem 1008 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1010 may be configured to communicatively couple computing system 1000 with one or more other computing devices. Communication subsystem 1010 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1000 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A wearable augmented reality computing device, comprising:
    a see-through display device;
    a graphical user interface displayed via the see-through display device;
    a sensor system including one or more sensors;
    a logic subsystem; and
    a storage subsystem comprising instructions stored thereon that are executable by the logic subsystem to:
        detect one or more objects located outside a field of view of the see-through display device available for the display of augmented reality imagery; and
        for each object of the one or more objects, providing indications to the user of presence and direction of the object located outside the field of view, the indications including a virtual map representing a physical area greater than the field of view in a vertical user gaze direction and a horizontal user gaze direction; and
        vary the indications provided to the user based on one or more of a change in a location of the object relative to the see-through display device, a distance of the object from the see-through display device, and a property of the object.

2. On an augmented reality computing device comprising a display system, a method for operating a user interface, the method comprising:

identifying one or more virtual objects located outside a field of view available for a display of augmented reality information; and for each object of the one or more virtual objects, providing to the user an indication of positional information associated with the virtual object within the field of view adjacent to a periphery of the field of view.

3. The method of claim 2, wherein the indication of positional information associated with the virtual object includes an indication of a position of the virtual object relative to a position of the user.

4. The method of claim 3, wherein the indication of positional information associated with the virtual object is displayed on a see-through display system.

5. The method of claim 3, wherein the indication of positional information associated with the virtual object is displayed on a see-through display system within the field of view of a user as a marker indicating a presence of the virtual object and a direction to turn to view the virtual object.

6. The method of claim 5, wherein the marker comprises a tendril extending from a location within the field of view to the virtual object.

7. The method of claim 5, further comprising varying a display of the marker based on one or more of a property of the virtual object, a distance from the virtual object to the user, and an orientation of the virtual object relative to the user.

8. The method of claim 7, wherein varying a display of the marker comprises one or more of varying a color of the marker, varying an opacity of the marker, varying a size of the marker, varying a shape of the marker, and varying a movement of the marker.

9. The method of claim 2, wherein the indication of positional information associated with the virtual object comprises one or more sounds emitted from speakers indicating a presence of the virtual object.

10. The method of claim 9, further comprising varying the one or more sounds emitted from speakers based on one or more of a property of the virtual object, a density of objects, a distance from the virtual object to the user, and an orientation of the virtual object relative to the user.

11. The method of claim 10, wherein varying the one or more sounds emitted from speakers comprises one or more of varying a volume of the one or more sounds, varying one or more frequencies of the one or more sounds, varying a position of the one or more sounds, and varying a tactile response.

12. The method of claim 2, wherein the display system comprises a see-through display system, and wherein the indication of positional information associated with the virtual object is displayed on the see-through display system as a virtual map.

13. The method of claim 2, wherein the indication of positional information associated with the virtual object is provided in response to user input.

14. On an augmented reality computing device comprising a see-through display system, a method for operating a user interface, the method comprising:

identifying an object located outside a field of view of the see-through display system available for a display of augmented reality information; and displaying via the see-through display system a tendril that leads from a location within the field of view toward the object, the tendril indicating a visual path to follow to locate the object.

15. The method of claim 14, wherein the tendril extends to the object.

16. The method of claim 14, further comprising animating an appearance of the tendril based upon user interaction with the object.

17. The method of claim 14, further comprising emitting a sound from one or more speakers to indicate creation of the tendril.

18. The method of claim 14, further comprising ceasing to display the tendril when the object enters the field of view.

19. The method of claim 18, further comprising varying a display of the tendril based on one or more of a property of the object, a distance from the object to the user, and an orientation of the object relative to the user, wherein varying a display of the tendril comprises one or more of varying a color of the tendril, varying an opacity of the tendril, varying a size of the tendril, varying a shape of the tendril, and varying a movement of the tendril.

* * * * *